United States Patent [19]
Lenz et al.

[11] Patent Number: 4,659,557
[45] Date of Patent: Apr. 21, 1987

[54] PROCESS FOR PRODUCING FERROUS SULPHATE IN GRANULE FORM

[75] Inventors: Uwe Lenz, Frechen; Günter Ritter, Brühl, both of Fed. Rep. of Germany

[73] Assignee: Rheinische Braunkohlenwerke AG., Köln, Fed. Rep. of Germany

[21] Appl. No.: 472,693

[22] Filed: Mar. 7, 1983

[30] Foreign Application Priority Data

Mar. 11, 1982 [DE] Fed. Rep. of Germany ....... 3208699

[51] Int. Cl.$^4$ .......................... C22B 1/14; C22B 1/08; C01G 41/14
[52] U.S. Cl. ......................................... 423/558; 75/3; 23/313 R; 23/313 P; 423/153; 423/267
[58] Field of Search .......... 423/558, DIG. 1, DIG. 2, 423/153, 267; 75/3; 23/313 R, 313 FB, 313 P

[56] References Cited

U.S. PATENT DOCUMENTS

| | | |
|---|---|---|
| 2,215,394 | 9/1940 | Hechenbleikner et al. .... 423/DIG. 2 |
| 2,711,951 | 6/1955 | West et al. ................... 75/3 |
| 2,771,342 | 11/1956 | Lamanna ............................. 423/558 |
| 4,123,257 | 10/1978 | Fukuoka et al. ........................... 75/3 |
| 4,195,986 | 4/1980 | Schulz et al. ............................. 75/3 |
| 4,292,085 | 9/1981 | Piccolo et al. ....................... 423/558 |

FOREIGN PATENT DOCUMENTS 957464 5/1964 United Kingdom ................ 423/558

*Primary Examiner*—Gary P. Straub
*Attorney, Agent, or Firm*—Seidel, Gonda, Goldhammer & Abbott

[57] ABSTRACT

In a process for making ferrous sulphate in granule form, ferrous sulphate heptahydrate is mixed with fine-grain brown coal or lignite having a low water content, in such an amount that the resulting mixture is pourable.

13 Claims, No Drawings

PROCESS FOR PRODUCING FERROUS SULPHATE IN GRANULE FORM

BACKGROUND OF THE INVENTION

The present invention is concerned with ferrous sulphate heptahydrate, and, more particularly, making ferrous sulphate in granular form.

Ferrous sulphate heptahydrate has the chemical formula $FeSO_4 . 7H_2O$ and may be alternatively referred to as copperas, being green in colour. It is a by-product which is produced primarily in the manufacture of titanium dioxide and, with pH-values of between 1 and 2, it is a highly acid salt. It may be used inter alia as a flocculating agent in cleaning waste water, and as a catalyst in the hydrogenating liquefaction of coal.

However, handling ferrous sulphate heptahydrate often gives rise to fairly serious difficulties, firstly because of its very acid nature and secondly because of the high residual content of moisture clinging thereto. Because of the former consideration for example it must be stored in suitably acid-resistant containers. In regard to the second consideration, if the substance is to be put into storage, the high residual moisture content thereof usually makes it necessary to take particular steps to ensure that the ferrous sulphate heptahydrate does not stick together to form lumps, for such lumps would tend severely to limit the pourability thereof, to such an extent that it may be possible to remove it from the container only by means of extensive loosening operations to break up the lumps again. In addition, storage containers require expensive cladding in order to protect the walls of the containers and other elements from corrosion.

SUMMARY OF THE INVENTION

An object of the present invention is to provide a process for making ferrous sulphate available in granule form.

Another object of the invention is to permit ferrous sulphate to be produced in a form such that it can be stored without substantial difficulty.

Yet another object of the present invention is to produce ferrous sulphate in the form of granules, such that the material can be pneumatically conveyed.

A further object of the present invention is to improve the handleability of ferrous sulphate heptahydrate.

A still further object of the invention is to provide ferrous sulphate heptahydrate in a form in which it is pourable and its tendency to cause corrosion due to its acid nature is at least reduced.

Yet a further object of the present invention is to provide ferrous sulphate in granule form, using inexpensive and readily available material for that purpose.

These and other objects are achieved by a process for making ferrous sulphate available in granule form, by the addition inter alia of coal. In that process, ferrous sulphate heptahydrate and brown coal or lignite in dust form with a low water content are mixed together in relative amounts such that the resulting mixture is pourable.

It will be noted at this point that the terms brown coal and lignite may be used interchangeably in this specification, so that a reference to brown coal is intended to include lignite and a reference to lignite is intended to include brown coal; in this connection, it may be noted that, although brown coal and lignite may generally be considered as the same material, on recent knowledge there may possibly be a difference between the two types of material, both of which are therefore encompassed by the present invention. For convenience and brevity herein, the term brown coal is generally used in this specification to denote both such forms of material.

By virtue of the brown coal which is mixed with the ferrous sulphate heptahydrate being in dust form, the brown coal preferably forms a virtually completely closed coating around the individual grains of the salt, thereby so-to-speak encapsulating it to separate it from its environment. It will thus be found that the resulting mixture retains its pourability, even when stored over a prolonged period of time.

The brown coal or lignite and ferrous sulphate heptahydrate are preferably mixed together in a proportion in the range of 6:1 to 1:6.6 by volume, and the moisture content of the brown coal may be for example as low as around 8 to 10%. The coal should have such a low water content that it is capable of very substantially absorbing the residual moisture of the salt, with the result that the tendency of the individual particles to cling together and form lumps is at least reduced to such a degree that the material retains its capacity for pneumatic conveyance. The step of binding the residual moisture of the salt by means of the coal also has the result that the corrosive effect of the ferrous sulphate components contained in the resulting mixture is markedly reduced. The resulting product is therefore a non-lumping, pourable and pneumatically conveyable mixture which can be readily stored in silos, even over prolonged periods of time, and which can be conveyed out of such silos by pneumatic means. It is considered that the above-mentioned effects of binding of the residual moisture and the accordingly very greatly reduced tendency on the part of the individual grains of the salt to cling together are evidently achieved by the fine particles of the coal dust closely surrounding the grains of salt on all sides.

The brown coal or lignite should be dried to the maximum degree practicable, for example to give a moisture content of down to 8%. The step of mixing fine brown coal or lignite dust and ferrous sulphate heptahydrate can be effected without difficulty. The mixture can thus be formed in any stirring unit which is suitable for that purpose, with the brown coal or lignite dust being added gradually or in one batch, in the desired proportion. It will be appreciated that, because there is a tendency for dust to be generated during the operating procedure, the step of mixing the materials should preferably be performed in closed vessels for operator health and environmental reasons.

It is important that the brown coal dust or lignite which is added to the ferrous sulphate then should not give rise to difficulties or cause trouble when the salt is put to its usual uses. That applies particularly when the ferrous sulphate heptahydrate is to be used as a catalyst in the hydrogenating liquefaction of coal or in the hydrogenating cracking of heavy or residual oils. In the former case, the operating procedure may be such that a portion of the coal which is subsequently to be supplied to the hydrogenating installation for operation therein is firstly used for improving the handleability of the ferrous sulphate heptahydrate and is therefore previously mixed therewith; in other words, a part of the coal dust which is to be treated in the hydrogenating installation is introduced into that installation, with the ferrous sulphate heptahydrate.

It is thought that the particular suitability of brown coal or lignite for mixing with the salt can probably be attributed to the fact that, by virtue of its original, very high water content, namely often 60% or more, the brown coal or lignite, when then dried, is also capable of absorbing and binding correspondingly large amounts of moisture.

As indicated above, it has been found that brown coal or lignite and ferrous sulphate heptahydrate can be mixed together in widely varying proportions, in order to achieve the desired result. Thus, it has been found for example that, when the ratio between the amounts of brown coal or lignite and ferrous sulphate heptahydrate which are to be mixed together is from 6:1 to 1:6.6 by volume, preferably 6:1 to 1:4, it was still possible to achieve useful mixing results. In other words, with the amount of brown coal or lignite being in the range of from six times the amount of ferrous sulphate heptahydrate to one quarter the amount of ferrous sulphate heptahydrate, the brown coal or lignite still has a sufficient capacity to influence the ferrous sulphate heptahydrate in such a way that it loses its tendency to form lumps or cakes and is therefore convenient and easy to handle.

The mixture of ferrous sulphate heptahydrate and brown coal or lignite can be readily put into intermediate storage for example in silos, where it can withstand high filling levels, filling the silos to levels of up to a range of 10 to 15 meters, without the mixture losing its original pourability; it was surprisingly found in many cases that the pourability of the mixture was even improved after storage for a few days.

DESCRIPTION OF A PREFERRED EMBODIMENT

The process according to the invention will be now described in greater detail with reference to an example of performance thereof;

The operating procedure comprised making five mixtures of ferrous sulphate heptahydrate and brown coal or lignite dust with a degree of dryness of 10% (referred to for the sake of brevity as DBC10 i.e., dry brown coal with a moisture content of 10%) with respective proportions of 4:1, 2:1, 1:1, 1:2 and 3:20 parts by volume. After the bulk density of each mixture had been determined, the respective mixtures were introduced into glass cylinders which were all 3.5 cm in inside diameter. In order to represent the pressure loading conditions in a silo, the charges of mixture in the glass cylinders were loaded with weights, the loading applied being 1 kg/cm$^2$ and thus corresponding to the load applied to a material filling a silo to a height of about 10 to 15 meters.

The loaded mixtures in the cylinders were stored for various periods of time as indicated below, and then tipped out, with the cylinder being tapped or knocked as required to just loosen the mixtures to initiate pouring thereof. When they were emptied out, they were evaluated in regard to their pourability. Any portions of material adhering to or clogging the wall of the vessel were also noted. Table 1 set out hereinafter shows the bulk densities of the individual mixtures. In this respect, it is found that the bulk densities of the mixtures decrease with an increasing proportion of brown coal or lignite, which in itself was to be expected. On the other hand however, there is no sign of a substantial change in bulk density as a result of storage of the mixtures tested. It will be seen from the Table that the bulk density values remain virtually constant over an initial storage period of 24 hours and then a period of 7 days.

Table 2 hereinafter sets out the results of evaluation in respect of pourability of the mixtures when they were tipped out of the test vessels, in the two right-hand columns of the Table. The middle column of the Table shows the condition of the respective mixtures in regard to pourability after storage for 24 hours, while the right-hand column shows the condition in regard to pourability after storage for 7 days. In this case too there is no sign of noteworthy differences between the results obtained, that is to say, even after storage over a prolonged period of time, it was not possible to find any differences in regard to the pourability or non-caking capability of the mixture.

The test results clearly show that ferrous sulphate heptahydrate is capable of being stored over a prolonged period of time, after being mixed with brown coal or lignite dust with a low moisture content. A similar result is also obtained in regard to the capacity for the mixture to be conveyed by pneumatic means. It will be appreciated that the present invention is not restricted to the test results set forth herein.

TABLE 1

| Ferrous sulphate heptahydrate/DBC10 | Bulk densities | Bulk densities (g/cm$^3$) | |
| --- | --- | --- | --- |
| | Initial | 24 hours | 7 days |
| 4:1 | 0.74 | 0.78 | 0.80 |
| 2:1 | 0.76 | 0.78 | 0.79 |
| 1:1 | 0.75 | 0.76 | 0.77 |
| 1:2 | 0.67 | 0.68 | 0.70 |
| 3:20 | 0.59 | 0.60 | 0.62 |
| 0:1 | 0.56 | 0.56 | 0.56 |

TABLE 2

| Ferrous sulphate heptahydrate/DBC10 | Evaluation of pourability | |
| --- | --- | --- |
| | After 24 hours | After 7 days |
| 4:1 | Pourable after heavy knocking, no material adhering | Highly pourable after light knocking, no material adhering |
| 2:1 | Pourable after knocking no material adhering | Highly pourable after light knocking, no material adhering |
| 1:1 | Pourable after knocking no material adhering | Highly pourable after light knocking, no material adhering |
| 1:2 | Pourable after knocking, no material adhering | Highly pourable after light knocking, no material adhering |
| 3:20 | Pourable after light knocking, no material adhering | Highly pourable after light knocking, no material adhering |
| 0:1 | Pourable, no material adhering | Highly pourable after knocking |

What is claimed is:

1. A process for producing pourable and storable ferrous sulphate consisting essentially of mixing ferrous sulphate heptahydrate and brown coal dust capable of absorbing a substantial amount of moisture in such amount to form granuales of ferrous sulphate and brown coal wherein the brown coal and the ferrous sulphate heptahydrate are mixed together in a proportion of 6:1 to 1:6.6 by volume and wherein the brown coal dust has a moisture content of 8% to 10%.

2. A process as set forth in claim 1 wherein the proportion is from 6:1 to 1:4 by volume.

3. A process as set forth in claim 1 wherein the mixture of brown coal and ferrous sulphate heptahydrate is put into storage for subsequent pneumatic conveyance therefrom.

4. A process as set forth in claim 1 including forming a coating of brown coal dust on the surface of grains of ferrous sulphate heptahydrate.

5. A process as set forth in claim 1 including dehydrating brown coal to reduce its moisture content prior to mixing the dehydrated brown coal with the ferrous sulphate heptahydrate.

6. A process as set forth in claim 1 including dehydrating brown coal until its moisture content is about 8% to about 10% and mixing the dehydrated brown coal with the ferrous sulphate heptahydrate.

7. A process for producing ferrous sulphate in granular form comprising coating grains of ferrous sulphate heptahydrate with brown coal dust capable of absorbing a substantial amount of moisture.

8. A process as set forth in claim 7 including dehydrating brown coal until its moisture content is about 8% to about 10% and coating the grains of ferrous sulphate heptahydrate with the dehydrated brown coal.

9. Granular ferrous sulphate comprising a core of ferrous sulphate heptahydrate and a coating of brown coal dust capable of absorbing a substantial amount of moisture.

10. Granular ferrous sulphate according to claim 9 wherein the brown coal dust is dehydrated prior to being coated on the ferrous sulphate heptahydrate.

11. Granular ferrous sulphate according to claim 9 wherein the brown coal dust has a moisture content of about 8% to about 10% prior to being coated on the ferrous sulphate heptahydrate.

12. Granular ferrous sulphate according to claim 9 wherein the brown coal and the ferrous sulphate heptahydrate are in a proportion of 6:1 to 1:6.6 by volume.

13. Granular ferrous sulphate according to claim 12 wherein the brown coal and the ferrous sulphate heptahydrate are in a proportion of 6:1 to 1:4 by volume.

* * * * *